United States Patent [19]

Bickerton

[11] Patent Number: 5,228,087
[45] Date of Patent: Jul. 13, 1993

[54] SPEECH RECOGNITION APPARATUS AND METHODS

[75] Inventor: Ian Bickerton, Leckhampton, England

[73] Assignee: Smiths Industries Public Limited Company, London, England

[21] Appl. No.: 908,806

[22] Filed: Jul. 7, 1992

Related U.S. Application Data

[63] Continuation-in-part of Ser. No. 502,743, Apr. 2, 1990, abandoned.

[30] Foreign Application Priority Data

Apr. 12, 1989 [GB] United Kingdom ............... 8908205

[51] Int. Cl.$^5$ .............................................. G10L 5/00
[52] U.S. Cl. .................................................. 381/43
[58] Field of Search ................................. 381/41–43; 395/2

[56] References Cited

U.S. PATENT DOCUMENTS

| | | | |
|---|---|---|---|
| 4,286,115 | 8/1981 | Sakoe | 381/43 |
| 4,624,008 | 11/1986 | Vensko | 381/43 |
| 5,040,215 | 8/1991 | Amano et al. | 381/43 |

OTHER PUBLICATIONS

"Isolated Word Recognition Method", IBM TDB vol. 29, No. 4, Sep. 1986.
"A Noise Compensating Spectrum Distance Measure Applied to Automatic Speech Recognition", by Bridle et al., Proc. of The Institute of Acoustics, vol. 6, No. 4, Nov. 1984, pp. 307–314.
"Application of Hidden Markov Models to Automatic Speech Endpoint Detection", by Wilpon et al., Computer Speech and Language, vol. 2, 1987, pp. 321–341.
"Experiments in Isolated Digit Recognition Using the Multi-Layer Perceptron", by Peeling et al., RSRE Memorandum No. 4073, Dec. 17, 1987, pp. 1–18.
"The JSRU Channel Vocoder", by Holmes, IEE Proc., vol. 127, Pt. F, No. 1, pp. 53–60, Feb. 1980.
"A Noise Compensating Spectrum Distance Measure Applied to Automatic Speech Recognition", by Bridle et al., Proc. Inst. Acoust. Autumn Meeting, Windeamere, Nov. 1984.
"Explicit Modelling of State Occupancy in Hidden Markov Models for Automatic Speech Recognition,"by Russell et al., Proc. IEEE Int. Conf. on Acoustics, Tampa, Mar. 26–29, 1985.
"Isolated Digital Recognition Using the Multi-Layer Perceptron" by Peeling et al., Proc. NATO ASI Speech Understanding, Bad Windsheim, Jul. 3–18, 1987.
"Learning Internal Represenations by Error Propagation", by Rumelhart et al., Inst. For Cogn. Science, UCSD, ICS Report 8506, Sep. 1985.
"Stochastic Models and Template Matching:[Etc]", by Bridle, Proc. Inst. Acoust., Autumn Meeting, Nov. 1984.
"Continuous Connected Word Recognition Using Whole Word Templates" by J. S. Bridle, et al., The Radio and Electronic Engineer, vol. 53, No. 4, pp. 167–175, Apr. 1983.

*Primary Examiner*—Emanuel S. Kemeny
*Attorney, Agent, or Firm*—Pollock, Vande Sande & Priddy

[57] ABSTRACT

Speech recognition is carried out by performing a first analysis of a speech signal using a Hidden Semi Markov Model and an asymmetric time warping algorithm. A second analysis is also performed using Multi-Layer Perceptron techniques in conjunction with a neural net. The first analysis is used by the second to identify word boundaries. Where the first analysis provides an indication of the word spoken above a certain level of confidence, an output representative of the word spoken may be generated solely in response to the first analysis, the second analysis being utilized when the level of confidence falls. The output controls a function of an aircraft and provides feedback to the speaker of the words spoken.

9 Claims, 1 Drawing Sheet

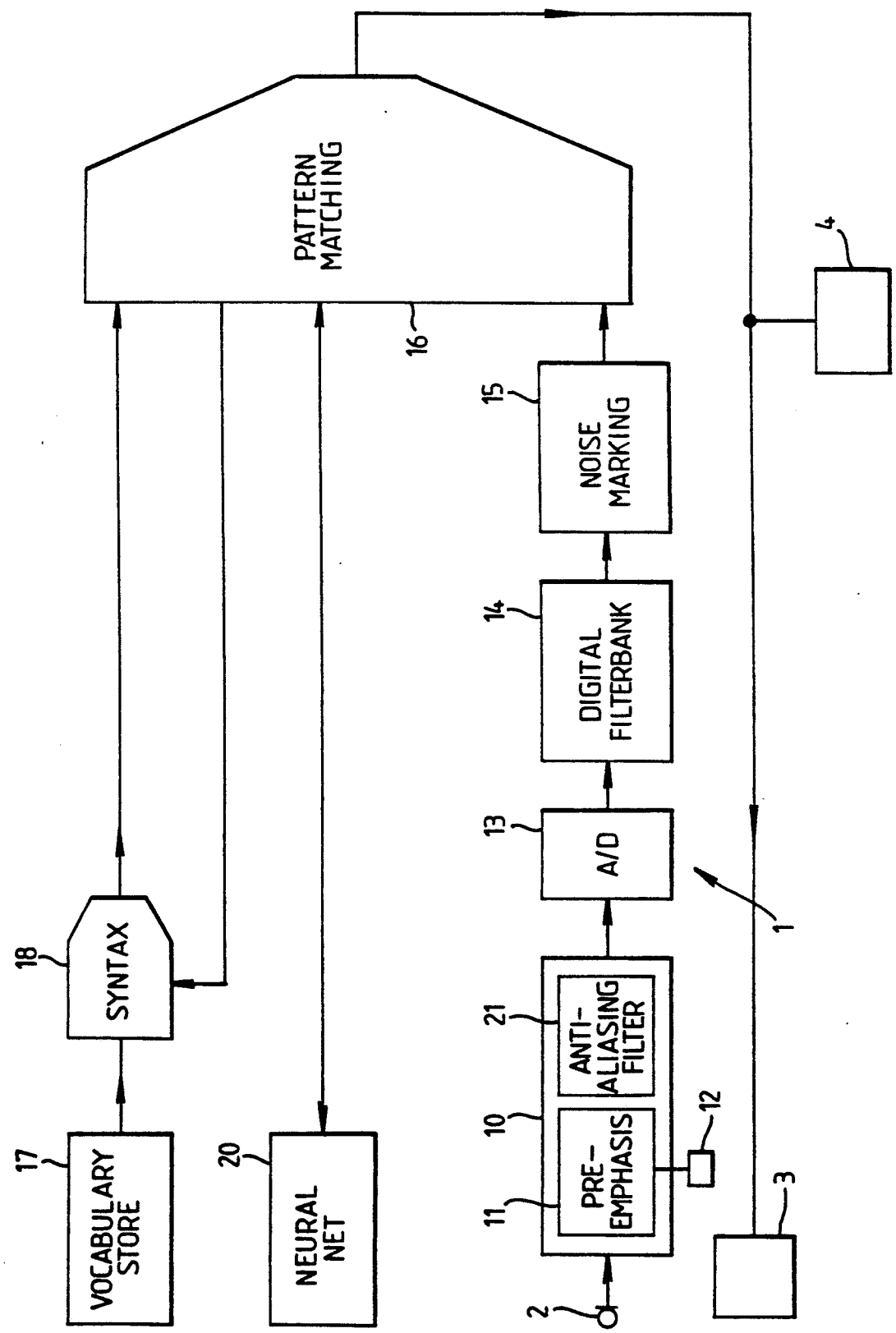

SPEECH RECOGNITION APPARATUS AND METHODS

This application is a continuation-in-part of Ser. No. 07/502,743, filed on Apr. 2, 1990, abandoned.

BACKGROUND OF THE INVENTION

This invention relates to speech recognition apparatus and methods.

In complex equipment having multiple functions it can be useful to be able to control the equipment by spoken commands. This is also useful where the user's hands are occupied with other tasks or where the user is disabled and is unable to use his hands to operate conventional mechanical switches and controls.

The problem with equipment controlled by speech is that speech recognition can be unreliable, especially where the voice of the speaker is altered by environmental factors, such as vibration. This can lead to failure to operate or, worse still, to incorrect operation.

Various techniques are used for speech recognition. One technique involves the use of Markov models which are useful because they readily enable the boundaries between words in continuous speech to be identified. In noisy environments or where speech is degraded by stress on the speaker, Markov model techniques may not provide sufficiently reliable identification of the words spoken. Considerable effort has been made recently to improve the performance of such techniques by noise compensation, compensation, syntax selection and other methods.

An alternative technique which has been proposed for speech recognition employs neural nets. These neural net techniques are capable of identifying individual words to high accuracy even when speech is badly degraded. They are, however, not suited to the recognition of continuous speech because they are not capable of accurately identifying word boundaries.

BRIEF SUMMARY OF THE INVENTION

It is an object of the present invention to provide improved speech recognition apparatus and methods.

According to one aspect of the present invention there is provided a method of speech recognition comprising the steps of performing a first analysis of a speech signal to identify boundaries between different words and to provide a first indication of the words spoken by comparison with a stored vocabulary, performing a second analysis of the speech signal utilizing neural net techniques and word boundary identification from the first analysis to provide a second indication of the words spoken, and providing an output signal representative of the words spoken from at least said second indication.

The first analysis may be performed using a Markov model which may be a Hidden Semi Markov model. The vocabulary may contain dynamic time warping templates and the first analysis may be performed using an asymmetric dynamic time warping algorithm.

The first analysis is preferably performed utilizing a plurality of different algorithms, each algorithm providing a signal indicative of the word in the vocabulary store closest to the speech signal together with an indication of the confidence that the indicated word is the word spoken, a comparison being made between the signals provided by the different algorithms. Where the first indication of the words spoken is provided with a measure of confidence, the output signal may be provided solely in response to the first indication when the measure of confidence is greater than a predetermined value.

The second analysis may be performed using a multilayer perceptron technique in conjunction with a neural net.

The output signal may be utilized to provide feedback to the speaker of the words spoken and may be utilized to control a function of an aircraft.

According to another aspect of the present invention there is provided apparatus for carrying out a method according to the above one aspect of the present invention.

According to a further aspect of the present invention there is provided speech recognition apparatus including store means containing speech information about a vocabulary of words that can be recognized, means for performing a first analysis of a speech signal to identify boundaries between different words and to compare the speech signal with the stored vocabulary to provide a first indication of the words spoken, means for performing a second analysis of the speech signal utilizing neural net techniques and word boundary identification from said first analysis to provide a second indication of the words spoken, and means for providing an output signal representative of the words spoken from at least the second indication.

The speech signal may be derived from a microphone. The apparatus may include a noise marking unit which performs a noise marking algorithm on the speech signals. The apparatus may include a syntax unit which performs syntax restriction on the stored vocabulary in accordance with the syntax of previously identified words.

Speech recognition apparatus and its method of operation in accordance with the present invention will now be described, by way of example, with reference to the accompanying drawing.

BRIEF DESCRIPTION OF THE DRAWING

The drawing shows the speech recognition apparatus schematically.

DETAILED DESCRIPTION OF THE PREFERRED EMBODIMENT

The speech recognition apparatus is indicated generally by the numeral 1 and receives speech input signals from a microphone 2 which may for example be mounted in the oxygen mask of an aircraft pilot. Output signals representative of identified words are supplied by the apparatus 1 to a feedback device 3 and to a utilization device 4. The feedback device 3 may be a visual display or an audible device arranged to inform the speaker of the words as identified by the apparatus 1. The utilization device 4 may be arranged to control a function of the aircraft equipment in response to a spoken command recognized by the utilization device from the output signals of the apparatus.

Signals from the microphone 2 are supplied to a pre-amplifier 10 which includes a pre-emphasis stage 11 that produces a flat long-term average speech spectrum to ensure that all the frequency channel outputs occupy a similar dynamic range, the characteristic being nominally flat up to 1 kHz. A switch 12 can be set to give either a 3 or 6 dB/octave lift at higher frequences. The pre-amplifier 10 also includes an anti-aliasing filter 21 in the form of an 8th order Butterworth low-pass filter with a −3 dB cut-off frequency set at 4 kHz.

The output from the pre-amplifier 10 is fed via an analogue-to-digital converter 13 to a digital filterbank 14. The filterbank 14 has nineteen channels implemented as assembly software in a TMS32010 microprocessor and is based on the JSRU Channel Vocoder described by Holmes, J. N. in IEE Proc., Vol 127, Pt.F, No.1, Feb 1980. The filterbank 14 has uneven channel spacing corresponding approximately with the critical bands of auditory perception in the range 250–4000 Hz. The responses of adjacent channels cross at approximately 3 dB below their peak. At the center of a channel the attenuation of a neighbouring channel is approximately 11 dB.

Signals from the filterbank 14 are supplied to an integration and noise marking unit 15 which incorporates a noise marking algorithm of the kind described by J. S. Bridle et al. 'A noise compensating spectrum distance measure applied to automatic speech recognition. Proc. Inst. Acoust., Windemere, Nov. 1984'. Adaptive noise cancellation techniques to reduce periodic noise may be implemented by the unit 15 which can be useful in reducing, for example, periodic helicopter noise.

The output of the noise marking unit 15 is supplied to a pattern matching unit 16 which performs a first analysis using various pattern matching algorithms. The pattern matching unit 16 is connected with a vocabulary store 17 which contains Dynamic Time Warping (DTW) templates and Markov models of each word in the vocabulary.

The DTW templates can be created using either single pass, time-aligned averaging or embedded training techniques. The template represents frequency against time and spectral energy.

The Markov models are derived during training of the apparatus from many utterances of the same word, spectral and temporal variation being captured with a stochastic model. The Markov model is made up of a number of discrete states, each state comprising a pair of spectral and variance frames. The spectral frame contains nineteen values covering the frequency range from 120 Hz to 4 kHz; the variance frame contains the variance information associated with each spectral vector/feature in the form of state mean duration and standard deviation information.

The individual utterances during training are analyzed to classify stationary phonetic states and their spectral transitions. The model parameters are estimated with an iterative process using the Viterbi re-estimation algorithm as described by Russell, M. J. and More, R. H. 'Explicit modelling of state occupancy in hidden Markov Models for automatic speech recognition', Proc IEEE Int. Conf. on Acoustics, Speech and Signal Processing, Tampa, 26–29 Mar. 1985. The final word model contains the natural spoken word variability, both temporal and inflection.

Intermediate the store 17 and the pattern matching unit 16 is a syntax unit 18 which performs conventional syntax restriction on the stored vocabulary with which the speech signal is compared, according to the syntax of previously identified words.

The pattern matching unit 16 is also connected with Neural Net unit 20. The Neural Net unit 20 incorporates a Multi-Layer Perceptron (MLP) such as described by Peeling, S. M. and Moore, R. H. 'Experiments in isolated digit recognition using the multi-layer perceptron' RSRE Memorandum No. 4073, 1987.

The MLP has the property of being able to recognize incomplete patterns such as might occur where high background noise masks low energy fricative speech. The MLP is implemented in the manner decribed by Rumelhart, D. E. et al. 'Learning internal representations by error propagation' Institute for Cognitive Science, UCSD, ICS Report 8506, September 1985.

The pattern matching unit 16 employs three different algorithms to select the best match between the spoken word and the words in the vocabulary.

One is an asymmetric DTW algorithm of the kind described by Bridle, J. S. 'Stochastic models and template matching: some important relationships between two apparently different techniques for automatic speech recognition' Proc. Inst. of Acoustics, Windemere, Nov. 1984 and by Bridle, J. S. et al 'Continuous connected word recognition using whole word templates'. The Radio and Electronic Engineer, Vol. 53, No. 4, April 1983. This is an efficient single pass process which is particularly suited for real-time speech recognition. The algorithm works effectively with noise compensation techniques implemented by the unit 15.

A second algorithm employs Hidden Semi Markov Model (HSMM) techniques in which the Markov Models contained within the vocabulary store 17 described above are compared with the spoken word signals. The additional information in the Markov Models about temporal and inflection variation in the spoken words enhances recognition performance during pattern matching. In practice, the DTW and HSMM algorithms are integrated with one another. The integrated DTW and HSMM techniques are capable of identifying boundaries between adjacent words in continuous speech.

A second analysis using a third algorithm employs MLP techniques in conjunction with the Neural Net 20. The MLP is controlled by the DTW/HSMM algorithm, the MLP having a variable window of view onto a speech buffer (not shown) within the pattern matching unit 16, the size and position of this window being determined by the DTW/HSMM algorithm. In this way, the HSMM algorithm is used by the MLP to identify the word boundaries or end points and the spectral time segments or word candidates can then be processed by the MLP. Each algorithm provides a signal indicative of its explanations of the speech signal such as by indicating the word in the vocabulary store identified by the algorithm most closely with the speech, together with a confidence measure. A list of several words may be produced by each algorithm with their associated confidence measures. Higher level software within the unit 16 compares the independent results achieved by each algorithm and produces an output to the feedback device 3 and utilization device 4 based on these results after any weighting.

In this way, the apparatus of the present invention enables Neural Net techniques to be used in the recognition of natural, continuous speech which has not previously been possible. One of the advantages of the apparatus and methods of the present invention is that it can have a short response time and provide rapid feedback to the speaker. This is particularly important in aircraft applications.

It will be appreciated that alternative algorithms may be used, it only being necessary to provide one algorithm capable of identifying word boundaries in conjunction with a second algorithm employing Neural Net techniques.

The Neural Net algorithm need not be used for every word. In some apparatus it may be arranged that the Markov algorithm alone provides the output for as long as its measure of confidence is above a certain level. When a difficult word is spoken, or spoken indistinctly or with high background noise, the measure of confidence will fall and the apparatus consults the Neural Net algorithm for an independent opinion.

It will be appreciated that the functions carried out by the units described could be carried out by programming of one or more computers and need not be performed by the discrete units referred to above.

The apparatus may be used for many applications but is especially suited for use in high noise environments, such as for control of machinery and vehicles, especially fixed-wing and rotary-wing aircraft.

What I claim is:

1. A method of word recognition in continuous speech comprising the steps of: deriving a speech signal; initially performing a first analysis of the speech signal by a Markov or other technique not involving neural net techniques to identify boundaries between different words and to separate the entire speech signal into discrete words; providing a first signal in accordance with the first analysis; comparing the first signal from the first analysis with a stored vocabulary of a multiplicity of words to provide a second signal that is a first indication of the words spoken; supplying the entire first signal provided by the first analysis to means for performing a second analysis different from the first analysis and utilizing neural net techniques on the entire words without any prior restriction of word candidates by the first analysis to produce a third signal representative of the words spoken; and providing an output signal representative of the words spoken from at least the third signal produced by the second analysis.

2. A method according to claim 1, wherein the vocabulary contains dynamic time warping templates.

3. A method according to claim 3, wherein the first analysis is performed using an asymmetric dynamic time warping algorithm.

4. A method according to claim 1, wherein the first analysis is performed utilizing a plurality of different algorithms, wherein each algorithm provides a signal indicative of the word in the vocabulary store closest to the speech signal together with an indication of the confidence that the indicated word is the word spoken, and wherein a comparison is made between the signals provided by the different algorithms.

5. A method according to claim 1, wherein the said first indication of the words spoken is provided with a measure of confidence, and wherein the said output signal is provided solely in response to said first indication when the measure of confidence is greater than a predetermined value.

6. A method according to claim 1, wherein the second analysis is performed using a multi-layer perceptron technique in conjunction with a neural net.

7. Speech recognition apparatus for recognizing words in continuous speech comprising: store means containing speech information about a vocabulary of words that can be recognized; means for deriving a speech signal; first analysis means for performing a first analysis of the entire speech signal by a Markov or other technique not involving neural net techniques, said first analysis identifying boundaries between all the different words in said continuous speech and providing a first signal in accordance therewith; means for comparing the first signal provided by the first analysis with the stored vocabulary to provide a second signal that is a first indication of the words spoken; second analysis means operative subsequent to the performance of said first analysis for performing a second analysis of the speech signal; means for supplying the entire first signal provided by said first analysis means to said second analysis means, said second analysis means utilizing neural net techniques and word boundary identification from said first analysis on the entire words without any prior restriction of word candidates by the first analysis; means for providing from the second analysis a second indication of the words spoken; and means for providing an output signal representative of the words spoken in response to at least the second indication.

8. Apparatus according to claim 7, wherein the apparatus includes a noise marking unit that performs a noise marking algorithm on the speech signals.

9. Apparatus according to claim 7, wherein the apparatus includes a syntax unit that performs syntax restriction on the stored vocabulary in accordance with the syntax of previously identified words.

* * * * *